June 1, 1943. A. G. FRAZER-NASH 2,320,456
VALVED COUPLING
Filed April 17, 1941
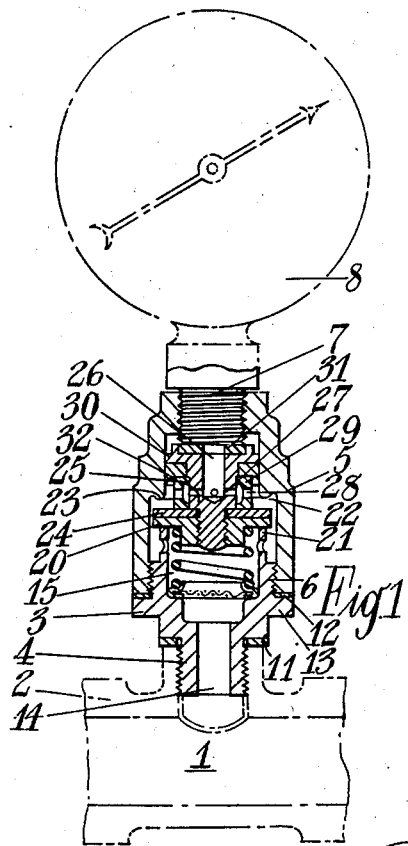
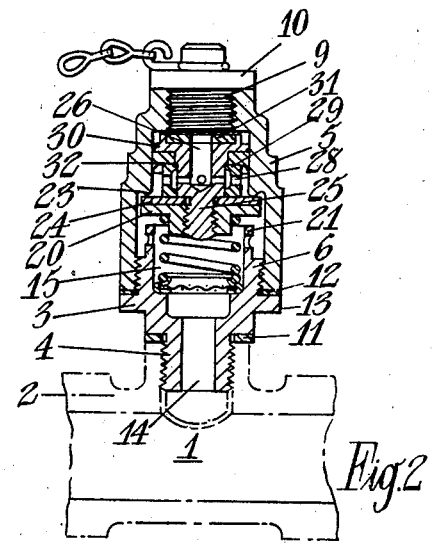
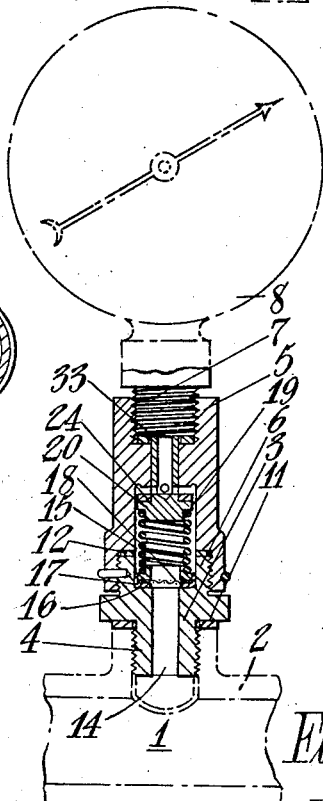
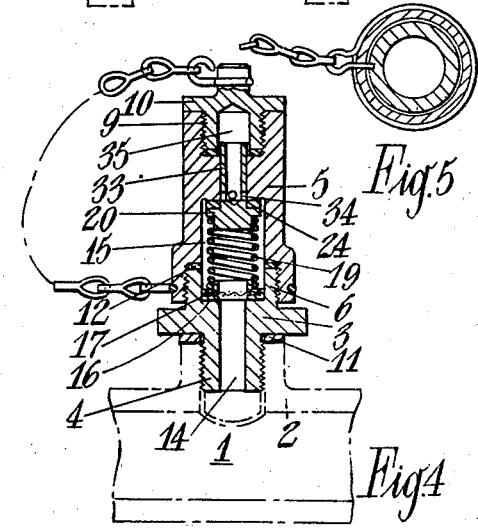
Inventor
A. G. Frazer-Nash
By: Glascock Downing & Seebold
Attys.

UNITED STATES PATENT OFFICE 2,320,456

VALVED COUPLING

Archibald Goodman Frazer-Nash, Tolworth, England

Application April 17, 1941, Serial No. 389,077
In Great Britain March 16, 1939

1 Claim. (Cl. 284—19)

This invention relates to valved couplings of the kind in which a valve element is arranged to be displaced from its seating by the engagement with the coupling of a pressure gauge or like device.

The most extensively used coupling device of the kind defined broadly above is in connection with pneumatic tyres.

The present invention, however, is mainly concerned with a coupling designed to be associated with systems in which a fluid and normally a liquid under high pressure is employed in the transmission of power.

The object of the invention is to provide a tubular coupling element of the kind furnished with means whereby a tubulure may be engaged therewith comprising a plunger adapted to contact with the extremity of the tubulure and forming part of or associated with a movable valve element arranged in axial alignment with the plunger and adapted to co-operate with a valve seating formed in the tubular element and to be displaced from its seating by the plunger element as the result of displacement of the plunger by the engagement of the tubulure with the coupling, and thereby provide a passage establishing communication between the device with which the coupling is associated and the tubulure.

The establishing of such communication will, when the tubulure of a pressure gauge is engaged with a coupling element of this kind, enable the fluid under pressure in the device to influence the pressure sensitive element of the pressure gauge.

According to the invention the plunger is provided with an axial recess extending from the face thereof, the base of which recess is connected by one or more radial passages with the space between the stem of the plunger and the interior walls of the tubular element, and is thus adapted when the valve is displaced from its seat, to permit communication between the device with which the coupling is associated and the tubulure.

Conveniently in the tubular element is provided a chamber in which is located a filter gauze and a helical spring, one end of which will seat upon a washer or rim associated with the filter gauze, the opposite end being designed to bear against the mushroom head of the movable valve element.

The tubular element may be formed in two parts, namely an upper main part and a lower or bottom cap and the walls of the cap may be externally screw-threaded and engaged with the internally screw-threaded end of the main portion of the tubular element in which is formed a seating for the movable valve element.

Preferably the movable valve element is provided with a facing formed of jointing material.

Optionally about the stem of the plunger there may be located an annular member furnished internally with a groove registering with the radial passages in the plunger and with radially extended perforations which communicate with an annular space provided between the exterior surface of the annular member and the interior wall of the tubular element.

With such a construction between the annular member and the mushroom head of the plunger element a seating washer may be engaged while the face of the plunger may be furnished with a joint washer against which the end of a tubulure, of, for instance, a pressure gauge inserted in the tubular element will bear.

The extremity of the plunger may be engaged in an aperture provided in the movable valve element to ensure that the plunger and valve element will be maintained in alignment.

Preferably in the tubular element there is located a member functioning as a limiting stop for restricting the degree to which the valve may be opened.

Thus where the tubular element is formed in two parts, namely a main part and a cap, the cap may be provided with an extension which is located within the main part of the tubular element and functions as a limiting stop and in the extension there is furnished a plurality of perforations adapted to permit the passage of fluid into the space between it and the tubular element and thus past the valve element when it is displaced from its seating.

Optionally the plunger is furnished with a sealing ring for securing a fluid-tight joint between the plunger and the interior walls of the tubular coupling.

The invention will be described further in detail and by way of example with reference to the accompanying drawing, in which—

Figure 1 is an elevation in section of one form of coupling in accordance with the invention, showing the position of the various parts when the tubulure of a pressure gauge is engaged therewith.

Figure 2 is a similar view of the same construction showing the position of the various parts when the pressure gauge is detached and the valve is closed.

Figure 3 is an elevation in section of a second construction in accordance with the invention, showing the parts in the position which they will occupy when the coupling is engaged with the tubulure of a pressure gauge.

Figure 4 is a similar view of the construction illustrated in Figure 3 showing the position which the parts will occupy when the pressure gauge is detached.

Figure 5 is a fragmentary plan view partly in section of the closure member employed in the constructions illustrated in Figures 1 to 4.

In the constructions illustrated, the reference numeral 1 indicates a pipe or conduit for fluid under pressure, the said pipe being formed with an internally screw-threaded branch 2 with which the coupling is adapted to be engaged.

The coupling is in the form of a tubular member consisting essentially of a lower part or bottom cap 3 having a screw-threaded boss 4 which is adapted to be entered into screw-threaded engagement with the branch 2, and an upper or main part 5 the lower extremity of which is internally screw-threaded to engage with a screw-threaded portion on the upwardly extending boss 6 of the bottom cap.

The upper or main part 5 is recessed and internally screw-threaded at the upper extremity thereof to engage with a screw-threaded tubulure 7 on a pressure gauge 8 or alternatively with a screw-threaded boss 9 on a closure member 10.

For effecting a fluid-tight joint between the bottom cap 3 and the branch 2, there is provided a packing or sealing ring 11 and for effecting a fluid-tight joint between the bottom cap and the upper or main part of the coupling there is provided a further sealing ring or packing 12 which in the case of the construction illustrated in Figures 1 and 2, is engaged between an outwardly extending flange 13 on the bottom cap and the lower extremity of the main part 5, and in the case of the construction illustrated in Figures 3 and 4, is engaged between the upper extremity of the boss 6 on the bottom cap and the immediately adjacent part of the main part 5.

In each of the constructions illustrated, the bottom cap is differentially bored to provide a passage 14 of relatively small diameter and a recess 15 of relatively larger diameter, the cap being bored in such manner as to provide therein a shoulder 16 constituting a seating upon which is arranged a washer or rim 17 and a filter gauze 18.

The said shoulder 16 also operates as an abutment for the lower end of a helical spring 19 the upper end of which engages against the head of a mushroom valve element 20.

In the construction illustrated in Figures 1 and 2, there is provided on the screw-threaded boss 6 a cylindrical extension 21, the upper extremity of which forms a seating for the valve head 20 when it is in the position shown in Figure 1, and the recess 22 within which the mushroom head is arranged is provided with an annular seating 23 against which the seating washer 24 on the valve head will seat when the valve is in the position shown in Figure 2.

The valve head is in screw-threaded engagement with the valve stem 25 which in the upper part thereof is formed with a recess 26, radial slots 27 which constitute ports being provided in the walls of the stem so as to provide a means whereby fluid may pass from the recess 22 through radial slots 28 in the grooved annular member 29 to the interior of the stem, and thence into the screw-threaded boss 7 of the pressure gauge.

The stem is also provided with a disc-like extension 30 the upper extremity of which is recessed to accommodate a packing washer 31 whereby a fluid-tight joint is secured between the valve stem and the lower extremity of the screw-threaded tubulure of the pressure gauge.

Engaged about the stem beneath the disc-like extension is a sealing ring 32 for securing a fluid-tight joint between the valve and the interior walls of the tubular coupling.

Normally, the various parts of the coupling are positioned as shown in Figure 2, that is to say, with the seating washer 24 engaged against the annular seating 23 under the action of the helical spring 19, so that when the closure element 10 is removed no escape of fluid can take place through the coupling.

When, on the other hand, the tubulure 7 of the pressure gauge is screwed down into the coupling, the valve washer 24 is displaced from its seating so as to permit fluid to pass in the direction indicated by the arrows in Figure 1, to the pressure gauge.

In the case of the construction illustrated in Figures 3 and 4, the head of the valve is rigidly secured to the tubular valve stem 33 and the valve washer 24 is adapted, in the closed position, to seat upon the seating 22 in the said upper or main part 5.

The tubular valve stem when the valve is in its closed position, has an extension at its upper end which extends somewhat above the level of the bottom of the recess within which the screw-threaded tubulure 7 on the pressure gauge or the boss 9 on the closure member 10 is adapted to be engaged, and is provided immediately above the valve head with a plurality of radial holes 34 whereby when the valve is in the open position fluid may pass from the branch 2 to the interior of the valve stem or plunger 33. The extension on the valve stem 33 constitutes the limiting member for controlling the degree to which the valve head may be opened, in that the screw-threaded tubulure 7 can only move the valve head downwardly a distance corresponding to the extension of the stem 33 projecting beyond the outlet passage.

Operation of this construction will be readily understood from a reference to Figures 3 and 4, from which it will be seen that when the closure member is in engagement with the coupling the valve is closed under the influence of the spring 19, whereas when the screw-threaded boss 7 on the pressure gauge is entered into engagement with the coupling the valve stem or plunger member 33 is moved downwards thereby urging the valve away from its seating and permitting a free communication of fluid through the radial ports 34 from the branch 2 to the pressure gauge.

It will be seen from Figure 4 that the interior of the closure member 10 is provided with an axial recess 35 for accommodating the projecting end of the plunger member 33 when the valve is in its closed position.

In the form shown in Figure 1, the means for restricting the degree in which the valve head may be opened is constituted by the extension 21.

It is to be understood that the foregoing detailed particulars are furnished solely with a view to illustrating by way of example certain suitable manners of carrying the invention into effect, and within the scope of the invention various modifications may be effected in the details of construction and general arrangement.

I claim:

A valve device of the character described including a casing forming a valve chamber adapted for connection with a fluid pressure conducting pipe, said casing including two parts, the bottom part being in the form of an attaching cup having a central inlet opening while the outer and main part is in the form of a cap and is in detachable threaded and telescoped engagement with the cup-like bottom part and forms with the bottom part a chamber and is further provided at its upper end with an outlet passage and with a valve seat surrounding the passage, a valve head disposed within the chamber, a spring bearing against the bottom part and the valve head for normally holding the latter against a seat, a hollow stem extending from the valve head and projecting into the outlet passage, said stem also having radial passages therethrough adjacent the head which permit the passage of liquid under pressure through the chamber and outlet passage when the valve stem is pressed inwardly to move the valve head into open position away from the seat and a member functioning as a limiting stop for restricting the degree to which the valve head may be opened.

ARCHIBALD GOODMAN FRAZER-NASH.